(12) United States Patent
Wing

(10) Patent No.: US 6,484,544 B1
(45) Date of Patent: Nov. 26, 2002

(54) LOCK

(76) Inventor: Leroy Albert Wing, 827 S. 17th St., Milwaukee, WI (US) 53204

( * ) Notice: Subject to any disclaimer, the term of this patent is extended or adjusted under 35 U.S.C. 154(b) by 35 days.

(21) Appl. No.: 09/679,257

(22) Filed: Oct. 4, 2000

Related U.S. Application Data

(60) Provisional application No. 60/157,662, filed on Oct. 5, 1999.

(51) Int. Cl.[7] .............................................. E05B 71/00
(52) U.S. Cl. ............................ 70/227; 70/62; 70/226; 70/233; 70/234; 211/5; 248/552
(58) Field of Search ........................... 70/62, 230, 164, 70/233–235, 58, 258, 225–227; 248/503, 552; 211/4, 5

(56) References Cited

U.S. PATENT DOCUMENTS

| | | | | |
|---|---|---|---|---|
| 1,202,444 A | * | 10/1916 | Soleau | |
| 2,693,691 A | * | 11/1954 | Pasanen | ........................ 70/58 |
| 3,498,400 A | * | 3/1970 | Hysmith | ........................ 70/14 |
| 3,752,254 A | * | 8/1973 | Carley et al. | ............. 70/230 X |
| 3,945,227 A | * | 3/1976 | Reiland | ........................ 70/58 |
| 4,052,867 A | * | 10/1977 | Faunce | ........................ 70/58 |
| 4,107,958 A | * | 8/1978 | Manley, Jr. | ........................ 70/58 |
| 4,473,176 A | * | 9/1984 | Harper | ..................... 70/58 X |
| 4,520,887 A | * | 6/1985 | Difazio | ..................... 248/503 X |
| 4,538,827 A | * | 9/1985 | Plifka | ..................... 70/14 X |
| 4,553,414 A | * | 11/1985 | Caputo et al. | ................ 70/58 |
| 5,052,198 A | * | 10/1991 | Watts | ........................ 70/58 |
| 5,085,395 A | * | 2/1992 | Frater et al. | ............. 70/58 X |
| 5,520,291 A | * | 5/1996 | Graham | ........................ 211/4 |
| 5,700,024 A | * | 12/1997 | Upchurch | ................. 280/507 |
| 5,983,685 A | * | 11/1999 | Garusworthy | ................ 70/234 |
| 6,138,483 A | * | 10/2000 | Galant | ..................... 70/62 X |

FOREIGN PATENT DOCUMENTS

| | | | | |
|---|---|---|---|---|
| CA | 1264699 | * | 1/1990 | ............... 70/234 X |
| FR | 2402574 | * | 5/1979 | ................. 70/235 |
| WO | WO 93/14955 | * | 8/1993 | .................... 70/58 |

* cited by examiner

*Primary Examiner*—Lloyd A. Gail
(74) *Attorney, Agent, or Firm*—Andrus, Sceales, Starke & Sawall

(57) ABSTRACT

A lock secured to a surface for releasably retaining a motorcycle thereon. The lock includes a pair of outer tubular members secured to the surface. The outer members each enclose a height adjustment bar secured to the lower end of the outer member. The height adjustment bars each include a number of laterally extending pins spaced along the length of the bar. A pair of inner tubular members including a keyway secured to a lower end of the inner member are slidably insertable into the outer members. The keyways pass around the pins on the height adjustment bar until the inner members are rotated to engage the keyways with a selected pin on the respective bars. Each inner member also includes a pair of opposed openings adjacent the upper end of the inner member that are aligned when the inner members are placed in the engaged position. After the motorcycle is placed between the engaged outer and inner members, a locking rod is inserted through one of the inner members, through the frame of the motorcycle, and through the opposite inner member. The locking rod includes a stop plate at one end to properly position the rod between the inner members and a locking bore opposite the stop member which receives a releasable locking member such as a padlock that selectively retains the locking rod in engagement with the inner members.

24 Claims, 2 Drawing Sheets

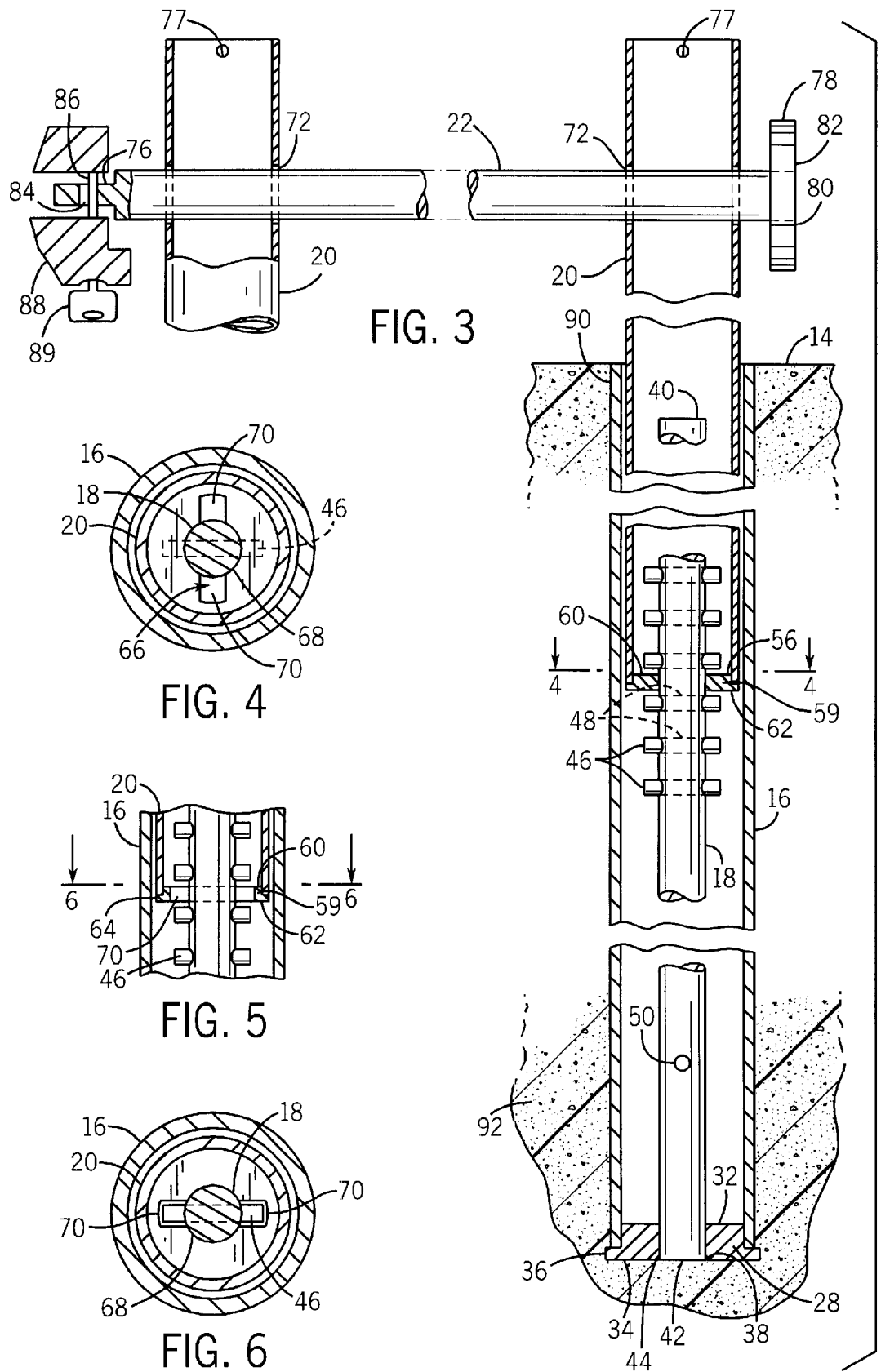

LOCK

CROSS REFERENCE TO RELATED APPLICATION

This application is based on and claims priority from provisional patent application Ser. No. 60/157,662 filed on Oct. 5, 1999.

FIELD OF THE INVENTION

The present invention is directed to a lock, and more specifically to a lock utilized for securing a vehicle or the like, such as a motorcycle, to a surface, such as a garage floor.

BACKGROUND OF THE INVENTION

In order to prevent the theft of certain wheeled vehicles and items such as motorcycles, locks are commonly used to secure the cycle to a stationary, immovable object such as a tree, bicycle rack, concrete post, or the like. The locks normally include a length of steel cable, connected links of steel chain, or a solid steel bar. With each of these different types of locks, the opposite ends of the cable, chain or bar are secured to a releasable locking mechanism that retains the lock in engagement with the object or structure to which the lock is secured.

The locks including a steel cable or steel chain links are useful in securing a motorcycle to a wide variety of stationary structures because the flexibility of the cable or chain enables the lock to conform to the shape of the stationary object and of the vehicle or item locked to the object. However, locks of this type are highly susceptible to being broken or defeated by a person utilizing an instrument such as a pair of wire or bolt cutters capable of cutting through the cable or chain links forming the lock. As a result, locks having a steel cable or interlocked steel chain links do not provide adequate protection from the theft of the item secured by the lock.

With respect to the types of locks formed with steel bars, these locks are better able to protect the item because they cannot be defeated through the use of an instrument such as a wire or bolt cutter due to the strength and rigidity of the steel bar. However, the size and shape of the steel bars employed by these locks prevents them from being utilized with the more substantial stationary structures that are utilized with the flexible steel cable and steel chain link locks. The reason for this is that the steel bar is generally U-shaped, having a specific width between the opposite legs of the bar that cannot be altered. As a result, the steel bar lock can only be used on small structures or objects, such as racks, sign posts, small trees, etc. that have a width or diameter less than the distance between the legs of the bar. Because in this case the lock is attached to a fairly insubstantial structure or object, but the lock cannot be easily removed from the item, it is possible that the structure or object to which the lock is attached can be removed, enabling an individual to detach the lock from the object and transport the item to a location where the steel bar lock can later be removed from the item. Further, the size and width of the U-shaped steel bar prevents the lock from being used with a wide range of items because the steel bar does not have sufficient size to fit around or through a number of item frames.

Therefore, it is desirable to develop a lock for wheeled vehicles and other items that combines the ability of a steel cable or chain lock to adapt to the shape of a particular vehicle or item frame with the strength and rigidity of the steel bar lock. The lock should also be easy to use without any complicated locking mechanisms or a multitude of parts such that a wide range of individuals would be able to use the lock.

SUMMARY OF THE INVENTION

It is an object of the invention to provide a lock for vehicles and other items that is rigidly secured to a surface and that combines the ability of a lock including a steel cable or chain to adapt to the shape of the particular vehicle to be locked with the strength and rigidity of a steel bar lock such that the lock can withstand a significant amount of damage without failing.

It is a further object of the invention to provide a lock that has a small number of moving and interlocking parts to greatly increase the ease of assembling and using the lock.

It is still a further object of the invention to provide a lock having the above features that can be collapsed and stored to prevent the lock from becoming an obstruction.

It is still another object of the invention to provide a lock having the above features that is constructed in an inexpensive manner from very rigid, durable materials to enable the lock to function properly over a long period of time.

The present invention is a lock for wheeled vehicles and other items that secures the vehicle rigidly to a surface. The lock is easily adjustable to accommodate a number of different frames and designs. The lock is also formed of strong, durable pieces that cannot be easily broken or removed.

The structure of the lock includes a pair of outer tubular members that are secured to the surface by forming a pair of spaced holes in the surface and placing an outer member in each hole. The hole is then filled with concrete around the outer member such that the outer member essentially becomes a part of the surface.

A pair of height adjustment bars are disposed within the outer tubular members. The adjustment bars are secured to the lower end of each outer member and extend upwardly through the outer member. A number of pins are disposed along the length of each adjustment bar and are used to adjust the operating height of the lock.

The lock further includes a pair of inner tubular members that are removably and slidably mounted within the outer tubular members. The inner members each have a keyway at the lower end that is selectively engageable with the pins disposed on the height adjustment bar. The keyway has a shape that enables it to selectively pass around and engage the pins located on the adjustment bar. As a result, the inner members can be positioned at various heights with respect to the outer members by engaging the keyways on the inner members with different pins located on the adjustment bar to accommodate different frame sizes and configurations.

Opposite the keyway, each inner tubular member also has a pair of openings disposed on opposite sides of the inner member. When the inner members are each engaged on the height adjustment bar in their respective outer members, the pairs of openings are aligned with one another.

To secure the frame to the inner and outer tubular members, the lock includes a locking rod that is insertable through the aligned openings in the ends of each inner member and the frame of the vehicle being locked. The locking rod has a bore disposed at one end and a stop ring opposite the bore. When the rod is fully inserted through the inner members and the frame, the stop ring engages the inner member opposite the bore to properly position the rod between the inner members. The bore receives a shackleless lock or other locking device that is secured therethrough to retain the locking rod and vehicle or item in engagement with the inner and outer members in order to prevent theft of the vehicle or item.

Various other features, objects and advantages of the invention will be made apparent from the following detailed description taken together with the drawings.

BRIEF DESCRIPTION OF THE DRAWINGS

The drawings illustrate the best mode presently contemplated of carrying out the invention.

In the drawings:

FIG. 3 is a cross-sectional view illustrating the engagement of the parts of the lock of FIG. 1;

FIG. 4 is a cross-sectional view along line 4—4 of FIG. 3;

FIG. 5 is a cross-sectional view similar to FIG. 3 illustrating the arrangement of the lock components in an adjustable position; and FIG. 6 is a cross-sectional view along line 6—6 of FIG. 5.

DETAILED DESCRIPTION OF THE INVENTION

Figure 1:
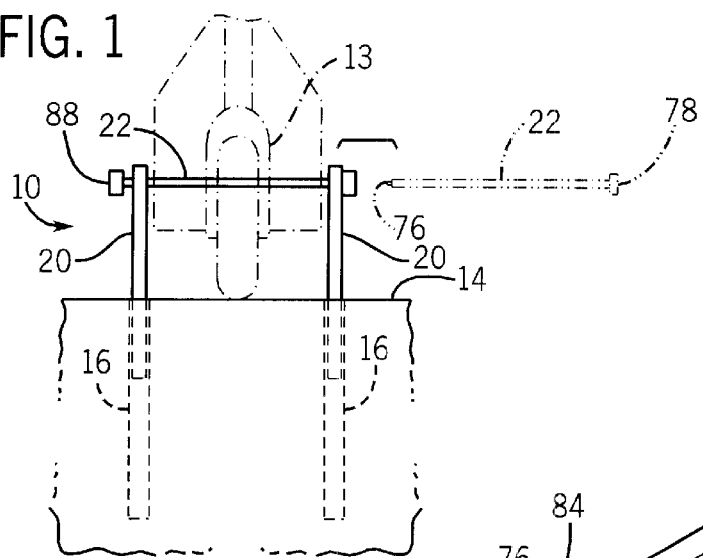
FIG. 1 is a front view of the lock of the present invention securing a motorcycle to a surface.

With reference now to the drawing figures in which like reference numerals designate like parts throughout the disclosure, the lock indicated generally at 10 is illustrated in FIG. 1. The lock 10 is shown securing a motorcycle 13 to a surface 14.

Figure 2:
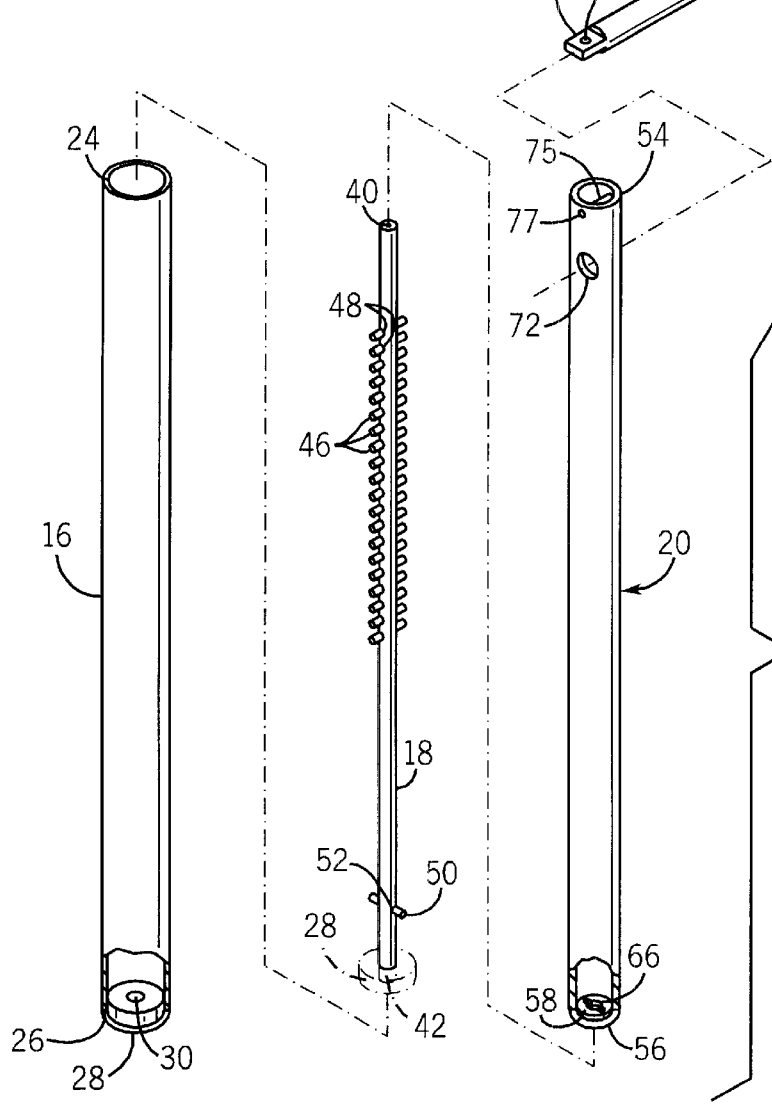
FIG. 2 is an exploded perspective view of the components forming the lock of FIG. 1.

Referring now to FIGS. 1–3, the lock 10 comprises a pair of outer tubular members 16 secured to the surface 14, a pair of height adjustment bars 18 secured within each of the outer members 16, a pair of inner tubular members 20 releasably engaged with the height adjustment bars 18 and slidable with respect to the outer members 16, and a locking rod 22 extending between the inner members 20 opposite the outer members 16.

Each outer member 16 is generally cylindrical in shape having an upper end 24 and a lower end 26. The outer members 16 are formed of a rigid material, such as steel, and have a length sufficient to extend an acceptable distance into the surface 14 in order to provide rigidity to the lock 10 and range of adjustment. The preferred length of the outer members 16 is thirty-nine (39) inches with an outer and inner diameter of around 2.875 inches and 2.5 inches, respectively.

A hub 28 is secured by welding to the lower end 26 of each outer member 16 and includes a central opening 30 extending between an inner face 32 and an outer face 34. The outer face 34 includes a radially extending flange 36 spaced from the opening 30 and a radially sloping surface 38 extending from the outer face 34 to the opening 30.

Each height adjustment bar 18 is formed of a rigid material, such as steel, and has an upper end 40 and a lower end 42 that is connected to the hub 28 within the central opening 30. The height adjustment bars 18 are shorter than the outer members 16 in which they are mounted having a preferred length of about thirty-six (36) inches and preferably 0.875 inches in diameter. The lower end 42 is positioned flush with the outer face 34 of the hub 28 and secured therein by a weld 44 connecting the lower end 42 of the adjustment bar 18 with the radially sloping surface 38 of the hub 28.

The height adjustment bar 18 also includes a number of pins 46 extending transverse to the adjustment bar 18. Each pin 46 is generally cylindrical in shape, is formed of a rigid material such as drill rod and is positioned within a channel 48 extending laterally through the adjustment bar 18. Each pin 46 extends outwardly from the adjustment bar 18 on each side of the bar preferably about 15.5 inches above the lower end 42 of the bar 18 to provide a number of adjustment points along the length of the bar 18. In one embodiment, there are twenty pins 46 disposed along the bar 18, spaced approximately 0.75 inches apart. The bar 18 also includes a safety pin 50 spaced downwardly from the pins 46. The safety pin 50 is formed similarly to the pins 46, and extends through a channel 52 in the bar 18 disposed perpendicular to the channels 48 that receive pins 46. Each pin 46, 50 is preferably 1.5 inches in length and 0.3125 inches in width.

The inner members 20 are also generally cylindrical in shape and have an outer diameter slightly less than the inner diameter of outer member 16, allowing the inner members to be slidably received within the outer members 20. Further, the inner members 20 are formed of a rigid material, such as reinforced steel. Each inner member 20 has a length of around 38.325 inches with an inner diameter of preferably around two (2) inches, and an outside diameter of preferably 2.375 inches.

The inner members 20 have an upper end 54 and a lower end 56 that includes an end cap 58. The end cap 58 is formed similarly to the hub 28, including an inner face 60 and an outer face 62. The outer face 62 includes a radially extending flange 64 that engages the lower end 56 of the inner member 20 when the end cap 58 is mounted to the inner member 20 by a weld 59. The end cap 58 also includes a keyway 66 disposed in the center of the end cap 58. Keyway 66 includes a central circular orifice 68 and a pair of generally rectangular slots 70 extending from opposite sides of the orifice 68. The orifice 68 is of a diameter sufficient to pass around the bar 18 and the slots 70 have a width sufficient to pass around the pins 46, 50.

Opposite the keyway 66, the inner members 20 include a pair of rod openings 72 approximately 1.0625 inches in diameter in opposite sides of the inner members 20 adjacent the upper end 54. The rod openings 72 are disposed approximately three (3) inches below upper end 54 and are oriented perpendicularly to the slots 70 in the keyway 66 and receive the locking rod 22. The inner members 20 also have a cylindrical handle 75 extending across the inner member 20 around 0.25 inches below the upper end 54 between a pair of apertures 77 of about 0.1406 inches in diameter located above the openings 72.

The locking rod 22 is a generally cylindrical rod of a rigid material, such as hardened steel, having a preferred length of thirty-six (36) inches, and one (1) inch in diameter that includes a chamfered end 76 and a stop ring 78 disposed opposite the chamfered end 76. The stop ring 78 is around three (3) inches in diameter and 0.5 inches thick and includes a central opening 80 into which the locking rod 22 is inserted. The rod 22 secured within the stop ring by a weld 82 between the stop ring 78 and rod 22 opposite the chamfered end 76. The chamfered end 76 is approximately one (1) inch long and includes a bore 84 extending therethrough that receives a latch portion 86 of a shackleless lock 88 or other similar releasable locking member.

To utilize the lock 10, first a pair of holes 90 are dug or otherwise formed in the surface 14. The holes 90 are preferably thirty-nine (39) inches deep, six (6) inches across and twenty-eight (28) inches apart, center to center, to insure that the chamfered end 76 of locking rod 22 extends completely through one of the inner members 20 when the stop ring 78 on the rod 22 engages the opposite, inner member 20. The outer members 16 including the height adjustment bars 18 are then positioned within the holes 90 such that the pins 46 on each bar 18 are aligned in the same plane. Each hole 90 is then filled with concrete 92 around each outer member 16 to secure the outer member 16 within and flush with the surface 14.

The inner members 20 are then slidably inserted into the respective outer members 16 using the handles 75 such that the keyway 66 is aligned with the pins 46, as best shown in FIGS. 5 and 6, enabling the keyway 66 to pass around the pins 46. When the inner member 20 is positioned at approximately the desired height above the surface 14, each inner member 20 is rotated 90° to misalign the keyway 66 with the pins 46 such that the selected pin 46 engages the outer face 62 of the endcap 58, as best shown in FIGS. 3 and 4. The motorcycle 13 may then be positioned between the inner members 20 such that the motorcycle frame 13 is aligned with the rod opening 72 in each outer member 20. The locking rod 22 is then inserted through the rod openings 72 in one inner member 20, through the motorcycle frame 13, and through the opposite inner member 20. The stop ring 78 on the rod 22 engages the first outer member 20 to properly position the chamfered end 76 outside of the second inner member 20. The latch portion 86 of the shackleless lock 88 is then inserted through the bore 84 in the chamfered end 76 and secured within the shackleless lock 88 using a key 89 to securely maintain the locking rod 22 in engagement with the respective inner members 20 and the motorcycle frame 13. To disengage the lock 10, the latch portion 86 of the shackleless lock 88 is disengaged from the bore 84 in the chamfered end 76 using the key 89, and the shackleless lock 88 is removed, allowing the locking rod 22 to slide outwardly from each inner member 20 and the motorcycle frame 13.

Further, if the lock 10 is not to be utilized for a period of time, the lock 10 can be stored within the surface 14 by rotating each inner member 20 to align the keyways 66 with the pins 46 as shown in FIGS. 5 and 6. The handle 75 on each inner member 20 is then grasped in order to lower each inner member 20 into the outer member 16. When the inner member 20 is lowered into the outer member 16 a sufficient distance, the keyway 66 contacts the safety pin 50. The safety pin 50 is present to insure that the inner member 20 does not inadvertently drop completely into the outer member 16. When the inner member 20 contacts the safety pin 50, the inner member 20 is rotated 90° to align the keyway 66 with the safety pin 50, enabling the inner member 20 to slide completely within the outer member 16. When it is desired to again use the lock 10, the individual grasps the handles and lifts each inner member 20 with respect to the outer member 16, rotating the keyway 66 as necessary to pass over the safety pin 50 and pins 46.

While the preferred materials for forming the components of the lock 10 is steel, any other suitable rigid material may be used. Also, as stated previously, the lock 10 can secure any number of movable items to the surface 14, and the surface 14 itself may be stationary or moveable.

A number of other embodiments of the lock 10 are also contemplated as being within the scope of the invention. For example, in another embodiment of the lock 10, one of the outer members 16 and one of the inner members 20 can be omitted such that the locking rod 22 can be secured directly to a structure such as a wall or post disposed adjacent the remaining outer member 16 and inner member 20 to provide the desired locking function.

Further, in still another embodiment of the lock 10, the inner member 20 can be engaged with the outer member 16 by one of a variety of locking mechanisms other than the keyway 66 and pin 46. For example, the inner member 20 can have an oval transverse dimension and include slots extending along its length that are engageable with inwardly extending tabs on the interior of the outer member 16.

In still another embodiment, the locking rod 22 may be replaced by another type of securing member, such as a chain, detachably extending between the respective inner members 20. The outer member 16 can also be mounted to extend above or be recessed below the surface 14 in order to further vary the applications to which the lock can be put.

Also, the handle 75 can have a number of different forms such as a knob extending from the exterior of the inner member 20 or a flexible member secured to a loop located on the interior of the inner member 20.

Various other alternatives and embodiments are considered to be covered by following claims particularly pointing out and distinctly claiming the subject matter regarded as the invention.

I claim:

1. A lock comprising:
  a pair of outer tubular members spaced from one another, each outer member having an upper end and a lower end and connected to an object;
  a pair of height adjustment bars secured within each outer tubular member and extending along the interior thereof, each adjustment bar including an array of pins spaced from one another and extending laterally through the adjustment bar;
  a pair of inner tubular members having an upper end, a lower end and an outer transverse dimension less than the inner transverse dimension of the outer tubular members and an inner diameter greater than the outer diameter of the adjustment bars, each inner member including a keyway and a pair of opposed openings spaced from the upper end, the inner members being insertable into the outer members and selectively engageable with the adjustment bars; and
  a rod having a stop plate at one end and a bore opposite the stop plate, the rod being insertable through the opposed openings in the respective inner tubular members.

2. The lock of claim 1 wherein each pin extends perpendicularly from the height adjustment bar.

3. The lock of claim 2 wherein each pin extends from both sides of the height adjustment bar.

4. The lock of claim 1 wherein the array of pins includes a safety pin adjacent the lower end of the adjustment bar and spaced from the remaining pins.

5. The lock of claim 4 wherein the safety pin is radially offset from the other pins in the array.

6. The lock of claim 5 wherein the safety pin is radially offset about 90° from the other pins in the array.

7. The lock of claim 1 wherein each height adjustment bar is secured within a hub attached to the lower end of the outer member.

8. The lock of claim 1 wherein the keyway is disposed within an end cap secured to each inner member.

9. The lock of claim 1 wherein each keyway includes a central circular portion and at least one slot extending outwardly from the central portion.

10. The lock of claim 1 wherein the outer tubular members, inner members and rod are formed from a rigid material.

11. The lock of claim 10 wherein the outer tubular members are formed from cold rolled steel.

12. The lock of claim 10 wherein the inner tubular members and rod are formed from hardened steel.

13. The lock of claim 1 wherein the outer tubular members are at least partially secured within a hole in a surface.

14. The lock of claim 13 wherein the outer tubular members are secured within the hole in the surface by concrete placed in the hole around the outer member.

15. The lock of claim 13 wherein the outer members are secured within the hole with the upper end flush with the surface.

16. A method for locking a vehicle to a surface comprising the steps of:
 a) providing a pair of outer tubular members having a pair of height adjustment bars attached to one end and extending therethrough, the adjustment bars including a number of spaced, laterally extending pins along its length;
 b) securing the outer tubular members to a surface;
 c) placing the vehicle between the outer tubular members;
 d) providing first and second inner tubular members having a keyway at a lower end and a pair of opposed openings adjacent an upper end;
 e) inserting the lower end of each inner tubular member into the respective outer tubular member around the adjustment bar such that the keyway passes around the pins and the adjustment bar until the inner member is positioned within the outer member a desired distance;
 f) rotating each inner tubular member within the outer tubular members to engage the keyway with a selected pin on each adjustment bar to maintain the inner member in position with respect to the outer members and the vehicle, and to align the opposed openings in each inner member;
 g) inserting one end of a locking rod having a stop ring at the opposite end successively through the openings the first inner tubular member, through the vehicle, and through the openings in the second inner tubular member to engage the stop ring with the first inner member; and
 h) placing a removable locking device through a bore in the locking rod opposite the stop ring to prevent the removal of the rod from the inner tubular members.

17. The method of claim 16 further comprising the step of aligning the outer tubular members with one another such that the pins in each outer member lie in the same plane prior to securing the outer member to the surface.

18. The method of claim 16 wherein the step of securing the outer tubular members to the surface includes the steps of:
 a) forming a hole in the surface;
 b) placing the lower end of the outer members in the holes; and
 c) filling the holes around the outer members with concrete.

19. The method of claim 18 wherein the step of placing the outer members in the holes comprises positioning the upper end of each outer member level with the surface.

20. The method of claim 17 wherein the step of inserting each inner tubular member into the respective outer tubular member includes the steps of:
 a) aligning the keyway on each inner member with the pins on the adjustment bar; and
 b) lowering the inner member into the respective outer member such that the keyway passes around the adjustment bar and the pins.

21. A motorcycle lock comprising:
 a pair of cylindrical outer members having an upper end and a lower end;
 a height adjustment bar attached to the lower end of each outer member and extending upwardly therethrough, the adjustment bar having a hub secured between a lower end of the bar and the lower end of the outer member, and a number of pins spaced from one another along the length of the adjustment bar and extending laterally from the bar;
 a pair of cylindrical inner members slidably insertable into the outer members, each inner member having a pair of opposed lateral openings adjacent an upper end and an end cap secured over a lower end, the end cap including a keyway with a circular center portion and a pair of opposed radially outwardly extending slots;
 a locking rod insertable through the openings in each of the inner members, the rod having a stop plate at one end and a bore opposite the stop plate; and
 a releasably lockable retention device insertable through the bore to retain the locking rod within the inner members.

22. The lock of claim 21 wherein the bore is disposed in a narrow end portion of the locking rod.

23. The lock of claim 21 wherein the end caps are welded to the inner members.

24. The lock of claim 23 wherein the keyways are situated within the end caps.

* * * * *